United States Patent
Kakumoto et al.

Patent Number: 5,516,214
Date of Patent: May 14, 1996

[54] ROLLING BEARING

[75] Inventors: Kenichi Kakumoto; Hiroaki Takebayashi; Yoshiki Fujii, all of Osaka; Tatsumi Hioki; Hirozumi Azuma, both of Aichi, all of Japan

[73] Assignee: Koyo Seiko Co., Ltd., Osaka, Japan

[21] Appl. No.: 361,814

[22] Filed: Dec. 22, 1994

[30] Foreign Application Priority Data

Dec. 27, 1993 [JP] Japan ................................ 5-330608

[51] Int. Cl.⁶ .................................................. F16C 33/62
[52] U.S. Cl. ............................................ 384/492; 384/912
[58] Field of Search .............................. 384/492, 912, 384/493, 565, 569, 615

[56] References Cited

U.S. PATENT DOCUMENTS

| | | |
|---|---|---|
| 3,198,735 | 8/1965 | Lamson et al. . |
| 3,722,969 | 3/1973 | Eklund .................... 384/492 |
| 4,072,368 | 2/1978 | Ehrentraut . |
| 4,293,171 | 10/1981 | Kakumoto et al. . |
| 4,490,264 | 12/1984 | Gerkema et al. . |
| 4,946,747 | 8/1990 | Bergmann et al. ............. 384/912 |

FOREIGN PATENT DOCUMENTS

| | | |
|---|---|---|
| 56-62661 | 10/1954 | Japan . |
| 58-113629 | 7/1983 | Japan . |
| 60-211750 | 10/1985 | Japan . |

*Primary Examiner*—Lenard A. Footland
*Attorney, Agent, or Firm*—Popham, Haik, Schnobrich & Kaufman

[57] ABSTRACT

The outer surface of a rolling element (3) of a rolling bearing is coated with a lubricating film (4) having three layers (5, 6, 7). The bottommost layer (5) coated on the surface of the rolling element (3) is made of Sn; the intermediate layer (6) coated on the surface of the bottommost layer (5) is made of Ag; and the topmost layer (7) coated on the surface of the intermediate layer (6) is made of Pb. As a result of this construction, Ag serves as a binder between the Pb-Sn alloy and steel constituting an inner race member (1), an outer race member (2) and/or the rolling element (3), which in turn renders the lubricating film (4) wettable with respect to the surfaces of the inner and outer race members (1, 2) defining a race and the outer surface of the rolling element (3). Hence, stable lubrication between the bearing components can be implemented.

1 Claim, 2 Drawing Sheets

ROLLING BEARING

BACKGROUND OF THE INVENTION

The invention relates to rolling bearings adapted for use in vacuum and high-temperature environments, and more particularly to an improvement of a lubricating film.

For rolling bearings used in the aforementioned environments where lubricating oils and greases cannot be applied, it is well known that at least one of the surface of a race member(s) defining a race, the surface of a rolling element, and the surface of the pocket of a retainer is coated with a lubricating film made of soft metal.

It is also well known that a material of which the lubricating film is made is silver or lead. For example, a lubricating film applied to a rolling bearing for X-ray tubes is subjected to such high ambient temperatures as 400° to 500° C., and this causes silver to lubricate in the solid state and lead in the molten state. Therefore, it can be said that lead is superior to silver for achieving better lubrication and noiseless running. Hence, lead is suitable as a material of which the aforementioned lubricating film applied to the rolling bearing for X-ray tubes is made.

If used as a material of which a lubricating film is made with steel being an object to be lubricated thereby, lead is relatively weak in adhesive strength in such a condition as to coat the steel surface. Therefore, an intermediate layer made of Sn or Pt is generally interposed between lead and steel in order to improve adhesive strength of lead. There is a strong tendency to use Sn because Pt is expensive and has a high melting point.

By the way, the lubricating film made of the aforementioned alloy has poor wettability with respect to steel in the molten state, making itself hard to stay in film form on the race surfaces of the race members, the surface of the rolling element, and the surface of the pocket of the retainer. Once such lubricating film has been removed from where the lubricating film is coated as a result of use of the bearing for a long period of time, it becomes difficult to cause a lubricant to be present on the surface of contact between the rolling element and the race surface of each of the inner and outer race members, as well as on the surface of contact between the rolling element and the surface of the pocket of the retainer. As a result, lubrication among the bearing components is decreased, which in turn causes the bearing to stick by contact between steel portions. Consequently, this brings about the problem of life.

SUMMARY OF THE INVENTION

The invention has been made in consideration of the aforementioned circumstances. Accordingly, an object of the invention is to provide a rolling bearing exhibiting low noise and extended life by improving wettability of the lubricating film in the molten state.

The invention is applied to a rolling bering, in which at least one of a race member and a rolling element is made of steel, and the surface of the race member and/or of the rolling element made of steel is coated with a lubricating film made of soft metal.

In such a rolling bearing, a first aspect of the invention is characterized in that the lubricating film includes: a topmost layer made of Pb; an intermediate layer arranged immediately below the topmost layer and made of Ag, Bi, or an Ag-Bi alloy; and a bottommost layer interposed between the intermediate layer and the steel, which becomes an object to be coated, and made of Sn.

In such a rolling bearing, a second aspect of the invention is characterized in that the lubricating film includes: a topmost layer made of Pb; a first intermediate layer arranged immediately below the topmost layer and made of Sn; a second intermediate layer arranged immediately below the first intermediate layer and made of Cu; and a bottommost layer interposed between the second intermediate layer and the steel, which becomes an object to be coated, and having an excellent adhesion with respect to the second intermediate layer and the steel.

Since the invention is characterized as selecting a lubricating film that melts basically at high temperatures, such lubricating film is superior in achieving better lubrication and noiseless running to lubricating films made of, e.g., silver. Since the invention is also characterized as giving the lubricating film an improved wettability with respect to steel in the molten state, the molten lubricant comes to be present stably on the rolling surface between the rolling element and the surface of the inner and/or outer race member(s) defining a race, which in turn allows lubrication among the bearing components to be maintained stably.

It should be noted that in the rolling bearing according to the first aspect of the invention, Ag, Bi, or the Ag-Bi alloy constituting the intermediate layer becomes mixed into Pb constituting the topmost layer and Sn constituting the bottommost layer with Pb and Sn being in the molten state, so that this mixed molten lubricant becomes easily wettable with respect to the surfaces of the bearing race members made of steel and/or the surface of the rolling element made of steel.

On the other hand, Pb constituting the topmost layer and Sn constituting the first intermediate layer are melted in the rolling bearing according to the second aspect of the invention. Since Cu constituting the second intermediate layer remains solid, it is with respect to this second intermediate layer that the molten lubricant becomes easily wettable.

DETAILED DESCRIPTION OF THE PREFERRED EMBODIMENTS

Figure 1:
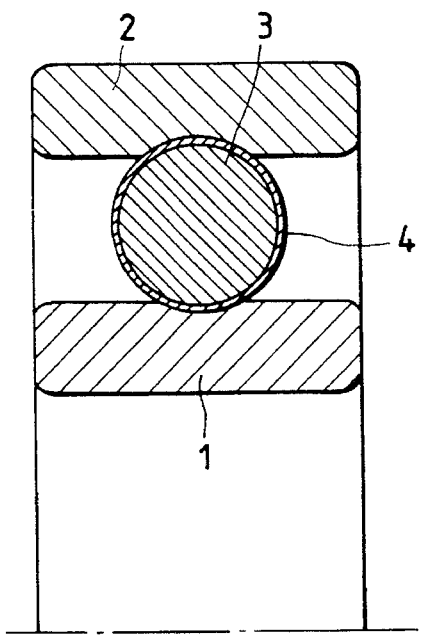
FIG. 1 is a longitudinal sectional view showing the upper half of the entire part of a rolling bearing, which is a first embodiment of the invention.
Figure 2:
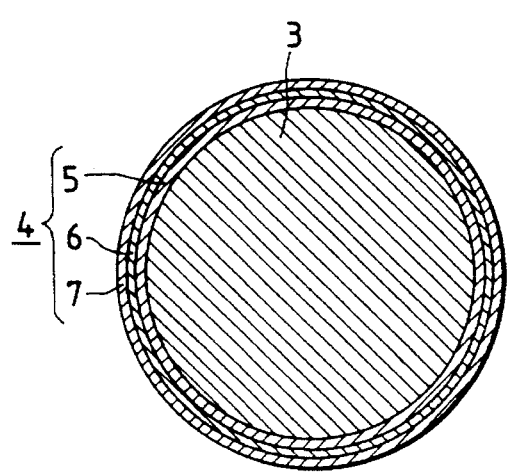
FIG. 2 is an enlarged sectional view of a rolling element in the first embodiment.

Details of the invention will now be described with reference to embodiments shown in FIGS. 1 to 3. FIG. 2 is an enlarged sectional view of a rolling element of a first embodiment; FIG. 1 is a longitudinal sectional view showing the upper half of the entire part of a rolling bearing. In FIG. 1, reference numeral 1 denotes an inner race member; 2, an outer race member; 3, a rolling element, which is a ball in this embodiment; and 4, a lubricating film. The inner and outer race members 1, 2 and the rolling element 3 are made of a steel whose grade according to the Japanese Industrial Standard (JIS) is SKH4 or the like.

While a case where the outer surface of the rolling element 3 is coated with the lubricating film 4 is exemplified in this embodiment, the lubricating film 4 may be applied to at least one of the outer surface of the rolling element 3 and the raceway surfaces of the inner and outer race members 1, 2 defining a race. A known coating method such as sputtering, ion plating, or the like is employed.

As shown in FIG. 2, the lubricating film 4 includes three layers 5, 6, 7. For example, the bottommost layer 5 made of Sn is coated on the surface of the rolling element 3; the intermediate layer 6 made of Ag (or Bi or an Ag-Bi alloy) is coated on the surface of the bottommost layer 5; and the topmost layer 7 made of Pb is coated on the surface of the intermediate layer 6.

As a result of this construction, Ag constituting the intermediate layer 6 is mixed into Pb constituting the topmost layer 7 and Sn constituting the bottommost layer 5 with Pb and Sn being in the molten and mixed state. Since Ag serves as a binder between the Pb-Sn alloy and the steel under such molten and mixed state, the molten lubricant becomes easily wettable with respect to the outer surface of the rolling element 3 itself and the surfaces of the inner and outer race members 1, 2. In other words, the lubricant melted and mixed on the rolling element 3 or transferred out of the rolling element 3 to the surfaces of the inner and outer race members 1, 2 becomes ready to be kept in filmlike form therein. As a result, surface of contact between the rolling element 3 and each of the surfaces of the inner and outer race members 1, 2 are lubricated stably, with such stable lubrication being kept over a long period of time.

As described above, the first embodiment is characterized as interposing the lubricant stably between the rolling element 3 and the surface of each of the inner and outer race members 1, 2 by keeping the molten lubricant at the outer surface of the rolling element 3 itself and the surfaces of the inner and outer race members 1, 2 to which the molten lubricant has been transferred.

Figure 3:
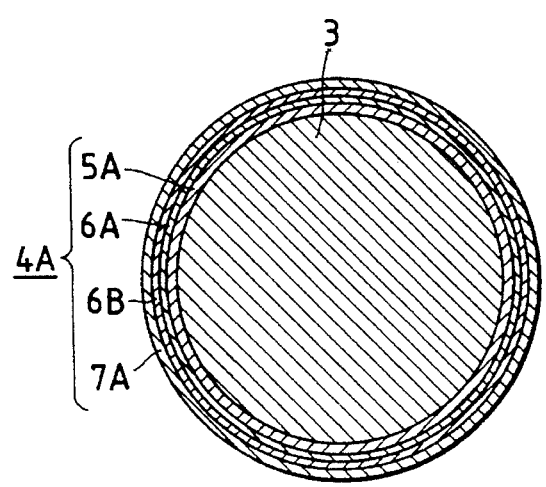
FIG. 3 is an enlarged sectional view of a rolling element in a second embodiment of the invention.

FIG. 3 is an enlarged sectional view of a rolling element in a second embodiment. A lubricating film 4A in this embodiment includes fourth layers 5A, 6A, 6B, 7A. The bottommost layer 5A made of Ni is coated on the surface of the rolling element 3; the second intermediate layer 6A made of Cu is coated on the surface of the bottommost layer 5A; the first intermediate layer 6B made of Sn is coated on the surface of the second intermediate layer 6A; and the topmost layer 7A made of Pb is coated on the surface of the first intermediate layer 6B. The bottommost layer 5A serves as increasing adhesive strength of the second intermediate layer 6A with respect to the rolling element 3 made of steel. Nickel constituting the bottommost layer 5A may be replaced with any element as long as the solubility of such replacement element with respect to Fe is larger than Cu and such replacement element therefore dissolves in Cu.

As a result of this construction, Pb constituting the topmost layer and Sn constituting the first intermediate layer melt. However, Cu constituting the second intermediate layer remains solid, so that it is with respect to the second intermediate layer that the molten lubricant becomes easily wettable.

As described above, the second embodiment is characterized as stably keeping the lubricant present on the rolling surface between the rolling element 3 and each of the surfaces of the inner and outer race members 1, 2 defining a race by keeping the molten lubricant on the portion on which the lubricating film 4 has already been coated, i.e., on the rolling element 3.

Figure 4:
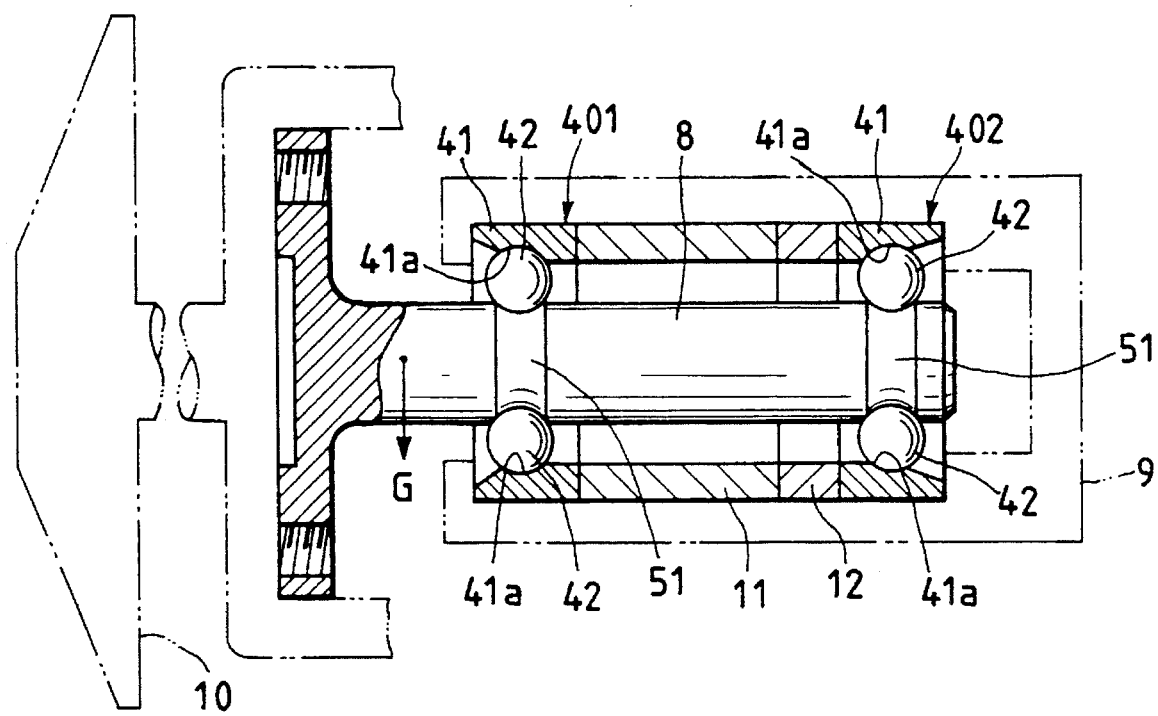
FIG. 4 is a sectional view of a rotary anode X-ray tube with a rolling bearing which is a third embodiment of the present invention.
Figure 5:
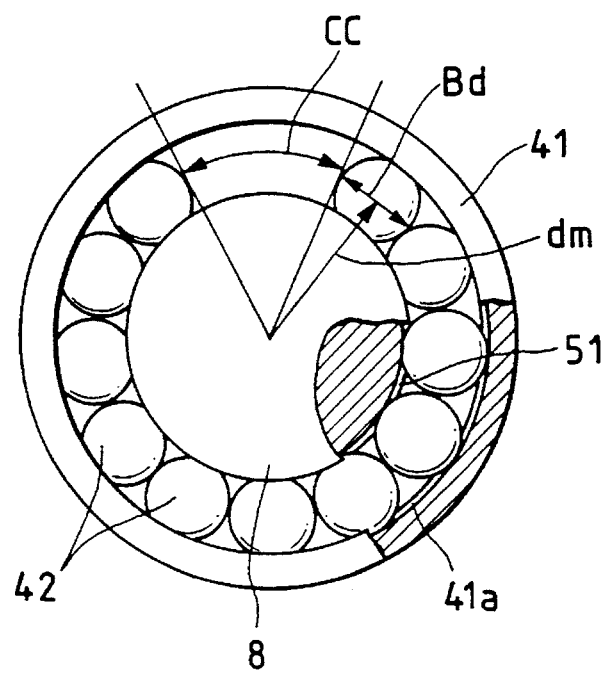
FIG. 5 is a sectional view of the rolling bearing shown in FIG. 4.

FIGS. 4 and 5 show a rotary anode X-ray tube in which a rolling bearing of the present invention is utilized.

In the rotary anode X-ray tube, a rotary shaft 8 is rotatably supported on a housing 9 through a pair of ball bearings 401 and 402 as shown in FIG. 4. Outer race members 41 and 41 are running-fitted on the housing 9 so that they can move in the axial direction relative to the housing 9. Reference numerals 11 and 12 designate collars made of stainless steel (JIS SUS440C).

Each of full type ball bearings 401 and 402 has such an integral, deep-groove structure that a large number of balls 42 without a retainer are interposed between an outer race groove 41a and an inner race groove 51 which is formed directly on the rotary shaft 5. Since the retainer restricting angular intervals of balls is dispensed with, the balls 42 in each full type ball bearing 401, 402 can move toward and away from each other.

The lubricating film of the invention is applied to at least one of the outer surface of the ball 42, the surface of the inner race groove 51 and the surface of the outer race groove 41a.

The coefficient of linear expansion in each of the rotary shaft 8, the outer race members 41 and the balls 42 is $11.0 \times 10^{-6}$.

Each full type ball bearing 401 and 402 is constructed such that the radius Pi of curvature of the inner race groove 51 is set to satisfy the formula:

$$Pi = (61\% \pm 2\%) \times Bd$$

where Bd is a diameter of the ball 42.

On the other hand, the radius Po of curvature of the outer race groove 41a is set slightly larger in comparison to that in a typical bearing from the viewpoint of the wear of the solid lubricating film, and namely satisfies the formula:

$$Po = (56\% \pm 2\%) \times Bd$$

As clearly from the above formulae, the radius Pi of curvature of the inner race groove 51 is set larger than the radius Po of curvature of the outer race groove 41a, whereby the contact area between the inner race groove 51 and the ball 42 is made smaller.

In the above-noted structure, if the thermal expansion occurs so that the rotary shaft 8, the balls 42 and the outer race members 41 are expanded both in axial and radial directions, then each of the outer race members 41 is displaced in the axial direction with respect to the respective inner race groove 51 so as to reduce the contact angle with the balls 42 disposed between the outer race groove 41a and the inner race groove 51. Since the inner race groove 51 is set larger than the outer race groove 41a in radius of curvature (Pi>Po), the balls 42 roll on and are guided by the outer race groove 41 but stay in the inner race groove 51 without riding onto the shaft shoulder during this displacement, which assures the rolling contact of the balls 42 with both the outer race groove 41a and the inner race groove 51. Thus, the slide or slip of the balls on the inner and outer race grooves 51 and 41a is reduced in comparison to the well-known structure to thereby reduce the wear of the lubricating film on the ball surface and extend the life of the bearing.

Further, the rate of thermal transmission from the rotary shaft 8 is reduced, whereby the temperature increase of the bearing is suppressed, and the damage onto the lubricating film is also reduced. Furthermore, the rotational torque τ is made small with the reduction of the contact area, so that the wear of the lubricating film is reduced.

As noted above, according to the full type ball bearing of the invention, the contact area between the ball 42 and the inner race groove 51 is reduced in addition to the prevention of the sliding motion of the ball 42. Further, the ball 42 is accommodated to the transverse sectional form of the inner race groove 51 and prevented from riding onto the shaft shoulder so as to make rolling contact with the inner race groove 51 even under the thermal expansion status. Consequently, it is possible not only to prevent the occurrence of the so-called shoulder ride but also to remove the drawbacks of the increased rotational torque, peeling of the lubricating film and so on. Thus, the life of the full type ball bearing lengthens. In particular, since the rotational torque can be reduced, it is possible to suppress the spin of the ball 42 on which the solid lubricating film is formed, and as a consequence, the damage on the lubricating film due to the friction to the race groove can be suppressed, which provides an advantage in extending the life of the solid lubricating film.

Moreover, according to the present embodiment, since the rate of thermal transmission from the rotary shaft 8 is reduced, which in turn reduces temperature increase of the bearing, the adverse thermal effect is hardly applied to the bearing. Thus, in view of this point, the present embodiment also contributes to the extension of the life.

The above-noted structure is applied to at least the first ball bearing 401 which is located nearer to a target plate 10 since the thermal effect from the rotary shaft is larger at the first ball bearing 401. In the present embodiment, the structure is also applied to the second ball bearing 402, that is, the radius Pi of curvature of the inner race groove 51 is set larger than the radius Po of curvature of the outer race groove 42a.

Each of the ball bearings 401 and 402 of the present embodiment is so structured such that if the balls 42 are gathered and arranged into a row in the race grooves 41a and 51, a clearance CC in the circumferential direction is formed between two balls respectively located at both ends of the row, and the clearance CC meets the following conditions:

$$CC = dm \times \sin(180° - Z \times \sin^{-1}(Bd/dm)) \quad 0.8 \times Bd \leq CC \leq 2.0 \times Bd$$

dm: a pitch circle diameter of each of the balls 42
Bd: a diameter of each of the balls 42
Z: the number of the balls 42

Since the above-noted structure is utilized, the adverse effect to the rotational torque due to delay of running of the balls 42 can be suppressed, in particular, in a high speed rotation. Thus, it is possible to suppress the interference of the balls 42 against each other and therefore to prevent the generation of the noise and the occurrence of the seizure. Further, the rotational torque of the bearing itself can be reduced.

In the present embodiment, the load capacity of the second full type ball bearing 402 is set smaller than that of the first full type ball bearing 401.

In case where the target plate 2 is supported through the rotary shaft 8 by the full type ball bearings 401 and 402 in a cantilever manner, the rotary shaft 5 tends to incline and is pulled toward the target plate 2, so that a pre-load is applied to the second ball bearing 402. Thus, a surface pressure caused on each of the balls in the second ball bearing 402 is made small.

On the other hand, if the thermal expansion is ignored, the axial load is hardly applied to the first ball bearing 401 which is located closer to the target plate 2, so that the specific ones among the balls 42 in the first ball bearing 401 exclusively receive the radial load under the over-hang condition. Thus, a surface pressure in the first bearing 401 is made large.

Therefore, if both the ball bearings 401 and 402 is manufactured with the same performance, the life of the product is depended on the shorter life of the first ball bearing 401.

In the present embodiment, the load capacity of the second ball bearing 402 is set smaller than that of the first ball bearing 401 so that the surface pressure is distributed uniformly, and the rotational torque of the second ball bearing 402 is made small so as to achieve the reduction of the entire rotational torque.

As an example for such arrangement, reducing the number of balls 42 in the second ball bearing 402 in comparison to the number of the balls 42 in the first bearing 401 is preferable.

Further, as another example, it is preferable that the diameter of each of the balls 42 in the second ball bearing 402 is made smaller than the diameter of the each of the balls 42 in the first ball bearing 401.

In each of the examples, since the rotational torque of the second ball bearing 402 is made small while the load capacity of the first ball bearing 401 is unchanged, the entire rotational torque can be reduced. That is to say, in the second ball bearing 402 since the so-called pre-load is applied thereto due to the axial load caused by the cantilever manner support, lowering the load capacity as noted above can reduce the rotational torque without adversely affecting the life of the product, and, on the other hand, in the first ball bearing 401 the load capacity thereof is not changed and thus the lift thereof is not changed. Thus, it is possible to reduce the entire rotational torque as well as to extend the life of the product.

While the cases of deep groove ball bearings have been exemplified in the aforementioned embodiments, the invention may be applicable to other types of rolling bearings, such as angular ball bearings, and three-point contact ball bearings.

Further, while the steel whose grade according to JIS is SKH4 is used in the aforementioned embodiments, other JIS grades such as SUS440C, SUS630, SUS304, or an ANSI grade M50, or a JIS grade SUJ2 provided with a coating of a corrosion resistance film, may be used as well. Still further, at least one of the rolling element 3 and the inner and outer race members may be made of ceramics such as silicon nitride, alumina, and silicon carbide.

Still further, while a full type ball bearing without retainer has been used in the aforementioned embodiments, a retainer such as a machined retainer, a corrugated retainer, or a capped retainer may be used. These retainers may be made of the JIS grade SUS304 steel, copper, or copper alloys, or synthetic resins such as polyamide resins, polyether ether ketone resins (PEEK), polyether sulfone resins (PES), polytetrafluoroethylene resins (PTFE), polyphenylene sulfide resins (PPS), phenol resins, polyimide resins, and polyamide imide resins. It should be noted that the lubricating film of the invention may be applied to the surfaces of the pockets of these retainers. Seal plates may also be applied to the end surfaces of the race members.

Since the invention is characterized as using a lubricating film that melts basically at high temperatures is used, the lubricating film of the invention is superior in achieving better lubrication and noiseless running to a lubricating film made of, e.g., silver. In addition, since the invention is also characterized as maintaining stable lubrication among the bearing components by giving the lubricating film an improved wettability in the molten state, this feature of the invention contributes to increasing the life of a bearing.

What is claimed is:

1. A rolling bearing, in which at least one of a race member and a rolling element is made of steel, and a surface of the bearing ring and/or of the rolling element made of steel is coated with a lubricating film made of soft metal, comprising an improvement wherein: the lubricating film includes a topmost layer being made of Pb, an intermediate layer being arranged immediately below the topmost layer and being made of Ag, Bi, or an Ag-Bi alloy, and a bottommost layer being interposed between the intermediate layer and the steel and being made of Sn, the steel becoming an object to be coated.

* * * * *